(12) United States Patent
Ziemer et al.

(10) Patent No.: US 10,632,835 B2
(45) Date of Patent: Apr. 28, 2020

(54) GEARING FOR A MOTOR VEHICLE, AND HYBRID DRIVE TRAIN WITH SAME

(71) Applicant: ZF Friedrichshafen AG, Friedrichshafen (DE)

(72) Inventors: Peter Ziemer, Tettnang (DE); Stefan Beck, Eriskirch (DE); Martin Brehmer, Tettnang (DE); Matthias Horn, Tettnang (DE); Johannes Kaltenbach, Friedrichshafen (DE); Julian King, Rankweil (AT); Bernd Knöpke, Salem (DE); Jens Moraw, Friedrichshafen (DE); Eckehard Münch, Bünde (DE); Gerhard Niederbrucker, Friedrichshafen (DE); Juri Pawlakowitsch, Kressbronn (DE); Stephan Scharr, Friedrichshafen (DE); Viktor Warth, Friedrichshafen (DE); Michael Wechs, Weißensberg (DE); Uwe Griesmeier, Markdorf (DE); Raffael Kuberczyk, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 372 days.

(21) Appl. No.: 15/572,011

(22) PCT Filed: Apr. 8, 2016

(86) PCT No.: PCT/EP2016/057680
§ 371 (c)(1),
(2) Date: Nov. 6, 2017

(87) PCT Pub. No.: WO2016/180584
PCT Pub. Date: Nov. 17, 2016

(65) Prior Publication Data
US 2018/0134144 A1   May 17, 2018

(30) Foreign Application Priority Data

May 8, 2015   (DE) .................. 10 2015 208 581

(51) Int. Cl.
*F16H 3/72* (2006.01)
*F16H 3/66* (2006.01)
(Continued)

(52) U.S. Cl.
CPC .............. *B60K 6/547* (2013.01); *B60K 6/365* (2013.01); *B60K 6/48* (2013.01); *F16H 3/663* (2013.01);
(Continued)

(58) Field of Classification Search
None
See application file for complete search history.

(56) References Cited

U.S. PATENT DOCUMENTS 6,558,287 B2   5/2003  Hayabuchi et al.
8,257,215 B2   9/2012  Borntraeger
(Continued)

FOREIGN PATENT DOCUMENTS

DE   19606771 A1   8/1997
DE   10213820 A1   10/2002
(Continued)

OTHER PUBLICATIONS

German Search Report DE102015208581.3 dated May 6, 2018. (8 pages).
(Continued)

*Primary Examiner* — Charles A Fox
*Assistant Examiner* — Ryan P Dodd
(74) *Attorney, Agent, or Firm* — Dority & Manning, P.A.

(57) ABSTRACT

A transmission (G) for a motor vehicle comprising an upstream gear set (VRS), a main gear set (HRS) with a total
(Continued)

of four shafts (W1, W2, W3, W4) referred to in order of rotational speeds as first, second, third and fourth shafts, an electric machine (EM), and at least five shift elements (A, B, C, E, F), the selective pairwise closure of which realizes at least eight selectable forward gear ratios (G1-G8) between a drive shaft (GW1) and an output shaft (GW2) of the transmission (G). The upstream gear set (VRS) provides a rotational speed at a fifth shaft (W5) increased relative to the rotational speed of the drive shaft (GW1), in a fixed transmission ratio with respect to the drive shaft (GW1). The main gear set (HRS) is a stepped planetary gear set (PS).

13 Claims, 7 Drawing Sheets

(51) Int. Cl.
*B60K 6/547* (2007.10)
*B60K 6/365* (2007.10)
*B60K 6/48* (2007.10)
*F16H 61/00* (2006.01)

(52) U.S. Cl.
CPC .. *F16H 61/0059* (2013.01); *B60K 2006/4816* (2013.01); *F16H 2200/006* (2013.01); *F16H 2200/0086* (2013.01); *F16H 2200/2007* (2013.01); *F16H 2200/2043* (2013.01); *F16H 2200/2046* (2013.01); *F16H 2200/2064* (2013.01); *F16H 2200/2094* (2013.01); *F16H 2200/2097* (2013.01); *Y02T 10/6221* (2013.01); *Y02T 10/6256* (2013.01)

(56) References Cited

U.S. PATENT DOCUMENTS

| | | | |
|---|---|---|---|
| 8,992,362 | B2 | 3/2015 | Ziemer et al. |
| 10,000,115 | B2* | 6/2018 | Ziemer ............... F16H 61/0403 |
| 2002/0142880 | A1 | 10/2002 | Hayabuchi et al. |
| 2005/0003924 | A1* | 1/2005 | Tabata ..................... F16H 3/66 |
| | | | 475/269 |
| 2007/0049444 | A1 | 3/2007 | Gumpoltsberger et al. |
| 2007/0219036 | A1 | 9/2007 | Bucknor et al. |
| 2011/0010063 | A1* | 1/2011 | Ota ........................ B60K 6/365 |
| | | | 701/58 |
| 2011/0045931 | A1 | 2/2011 | Raghavan et al. |
| 2011/0124455 | A1 | 5/2011 | Borntraeger et al. |
| 2013/0196808 | A1* | 8/2013 | Ziemer ................. B60K 6/365 |
| | | | 475/5 |

FOREIGN PATENT DOCUMENTS

| | | |
|---|---|---|
| DE | 102005040769 A1 | 3/2007 |
| DE | 102007005438 A1 | 8/2008 |
| DE | 102008016784 A1 | 10/2009 |
| DE | 102008040498 A1 | 1/2010 |
| DE | 102010034288 A1 | 4/2011 |
| DE | 102012201377 A1 | 8/2013 |
| DE | 102013110710 A1 | 4/2014 |

OTHER PUBLICATIONS

International Search Report (English Translation) PCT/EP2016/057680, dated Jun. 15, 2016. (3 pages).

* cited by examiner

| | A | B | C | D | E | F | K0 | TRANSMISSION RATIO | GEAR RATIO STEP |
|---|---|---|---|---|---|---|---|---|---|
| G1 | | | O | | | O | O | 4.73 | |
| | | | | | | | | | 1.59 |
| G2 | | O | | | | O | O | 2.98 | |
| | | | | | | | | | 1.56 |
| G3 | | | | | O | O | O | 1.91 | |
| | | | | | | | | | 1.55 |
| G4 | | O | | | O | | O | 1.23 | |
| | | | | | | | | | 1.23 |
| G5 | | | O | | O | | O | 1.00 | |
| | | | | | | | | | 1.28 |
| G6 | O | | | | O | | O | 0.78 | |
| | | | | | | | | | 1.14 |
| G7 | O | | O | | | | O | 0.68 | |
| | | | | | | | | | 1.08 |
| G8 | O | O | | | | | O | 0.63 | |
| | | | | | | | | | Spread: 7.5 |
| R1 | | | O | O | | | O | -3.10 | |
| R2 | | O | | O | | | O | -1.95 | |
| G1 | | | O | | | O | | 7.51 | |
| | | | | | | | | | 1.59 |
| G2 | | O | | | | O | | 4.73 | |
| | | | | | | | | | 1.56 |
| G3 | | | | | O | O | | 3.03 | |
| | | | | | | | | | 1.55 |
| G4 | | O | | | O | | | 1.96 | |
| | | | | | | | | | 1.23 |
| G5 | | | O | | O | | | 1.59 | |
| | | | | | | | | | 1.28 |
| G6 | O | | | | O | | | 1.24 | |
| | | | | | | | | | 1.14 |
| G7 | O | | O | | | | | 1.08 | |
| | | | | | | | | | 1.08 |
| G8 | O | O | | | | | | 1.00 | |
| R1 | | | O | O | | | | -4.92 | |
| R2 | | O | | O | | | | -3.10 | |
| GEN | | | | | | | O | | |
| P | | | | O | | O | | | |

Fig. 3

| | A | B | C | D | E | F | K0 | TRANSMISSION RATIO | GEAR RATIO STEP |
|---|---|---|---|---|---|---|---|---|---|
| G1 | | | O | | | O | O | 3.72 | |
| | | | | | | | | | 1.59 |
| G2 | | O | | | | O | O | 2.34 | |
| | | | | | | | | | 1.18  1.57 |
| G3 | | | | | O | O | O | 1.98 | 1.32 |
| G4 | | O | | | O | | O | 1.49 | |
| | | | | | | | | | 1.49 |
| G5 | | | O | | O | | O | 1.00 | |
| | | | | | | | | | 1.29 |
| G6 | O | | | | O | | O | 0.77 | |
| | | | | | | | | | 1.11  1.22 |
| G7 | O | | O | | | | O | 0.70 | 1.11 |
| G8 | O | O | | | | | O | 0.63 | Spread: 5.9 |
| R1 | | | O | O | | | O | -1.78 | |
| R2 | | O | | O | | | O | -1.12 | |
| G1 | | | O | | | O | | 5.91 | |
| | | | | | | | | | 1.59 |
| G2 | | O | | | | O | | 3.72 | |
| | | | | | | | | | 1.18 |
| G3 | | | | | O | O | | 3.14 | |
| | | | | | | | | | 1.32 |
| G4 | | O | | | O | | | 2.37 | |
| | | | | | | | | | 1.49 |
| G5 | | | O | | O | | | 1.59 | |
| | | | | | | | | | 1.29 |
| G6 | O | | | | O | | | 1.23 | |
| | | | | | | | | | 1.11 |
| G7 | O | | O | | | | | 1.11 | |
| | | | | | | | | | 1.11 |
| G8 | O | O | | | | | | 1.00 | |
| R1 | | | O | O | | | | -2.83 | |
| R2 | | O | | O | | | | -1.78 | |
| GEN | | | | | | | O | | |
| P | | | | O | | O | | | |

Fig. 6

GEARING FOR A MOTOR VEHICLE, AND HYBRID DRIVE TRAIN WITH SAME

FIELD OF THE INVENTION

The invention generally relates to a transmission for a motor vehicle having an upstream gear set, a main gear set, a driveshaft, an output shaft and at least five shift elements. The invention also relates to a hybrid drivetrain for a motor vehicle.

BACKGROUND

A transmission refers particularly to a multi-ratio transmission in which a multiplicity of gear ratios, that is to say transmission ratios, between the drive shaft and the output shaft are selectable, preferably in automatic fashion, by shift elements. The shift elements are in this case for example clutches or brakes. Such transmissions are used particularly in motor vehicles for the purposes of suitably adapting the rotational speed and torque output characteristics of the drive unit to the driving resistances of the vehicle.

An automatic transmission for a vehicle is known from the publication DE 102 13 820 A1. However, said automatic transmission does not have an electric machine.

In the prior art, it is known for an existing automatic transmission to be supplemented by an electric machine in order to permit purely electric or hybrid driving operation of a motor vehicle by the automatic transmission. Normally, a rotor of the electric machine is rotationally fixedly connected to the drive shaft for this purpose. The rotor may however also be connected to a shaft of the automatic transmission which is neither the input nor the output shaft. By way of example, reference is made in this regard to the applicant's publication DE 10 2007 005 438 A1. However, according to the teaching of said publication, the electric machine cannot output or receive power in all gear ratios of said automatic transmission, because said electric machine is arranged on the same shaft as a brake of the automatic transmission.

It is also known for the electric machine to be connected to an existing automatic transmission by a fixed upstream transmission ratio with respect to the drive shaft. By way of example, reference is made in this regard to the applicant's publication DE 10 2008 040 498 A1, wherein a hybrid module with a transmission ratio stage is provided which is connected upstream of the automatic transmission itself. By the fixed upstream transmission ratio, the electric machine is configurable for higher rotational speeds and lower torque, and thus the electric machine has a small structural space requirement. However, the automatic transmission according to the prior art requires an additional planetary gear set for this purpose, and thus the effort for constructing the automatic transmission is increased.

SUMMARY OF THE INVENTION

Therefore, the object of the invention is to provide a transmission for a motor vehicle, which transmission has an integral electric machine with upstream transmission ratio for providing hybrid-typical functionalities in all gear ratios without unduly increasing the effort in terms of construction. Furthermore, the transmission should have a simple and compact design.

The transmission has an upstream gear set, a main gear set and at least five shift elements, the selective pairwise closure of which realizes at least eight selectable forward gear ratios between a drive shaft and an output shaft of the transmission.

The main gear set has a total of four shafts which are referred to, in the order of their rotational speeds, as first, second, third and fourth shafts. The four shafts referred to, in rotational speed order, as first, second, third and fourth shafts are distinguished by the fact that the rotational speeds of said shafts linearly increase or decrease in the stated sequence, or are equal. In other words, the rotational speed of the first shaft is lower than or equal to the rotational speed of the second shaft. The rotational speed of the second shaft is in turn lower than or equal to the rotational speed of the third shaft. The rotational speed of the third shaft is lower than or equal to the rotational speed of the fourth shaft. This sequence is also reversible, such that the fourth shaft has the smallest rotational speed, whereas the first shaft assumes a rotational speed higher than or equal to the rotational speed of the fourth shaft. There is always a linear relationship between the rotational speeds of all four shafts. The rotational speed of one or more of the shafts may in this case also assume negative values, or even the value zero. The rotational speed order therefore always relates to the signed value of the rotational speeds, and not to the magnitude thereof.

The upstream gear set is configured to provide, at a fifth shaft, a rotational speed increased relative to the rotational speed of the drive shaft. There is a fixed transmission ratio between the drive shaft and fifth shaft. This may be realized in a variety of ways, for example by a spur-gear drive or a planetary gear set.

The fifth shaft is connectable to the fourth shaft of the main gear set by closing the first shift element. The fifth shaft is connectable to the first shaft of the main gear set by closing the second shift element. The drive shaft is connectable to the first shaft of the main gear set by closing the third shift element. The drive shaft is connectable to the second shaft of the main gear set by closing the fourth shift element. The fourth shaft of the main gear set can be rotationally fixedly immobilized by closing the fifth shift element, by connecting the fourth shaft to a housing or to some other rotationally fixed structural element of the transmission. The third shaft of the main gear set is permanently connected to the output shaft of the transmission.

According to the invention, a rotor of an electric machine is permanently rotationally fixedly connected to the fifth shaft. As a result of this connection, the rotor of the electric machine rotates at a higher rotational speed than the drive shaft in all gear ratios. Thus, the electric machine is configurable for higher rotational speeds and lower torque, whereby the electric machine is smaller and less expensive to produce. Furthermore, the upstream gear set is involved in the formation of the forward gear ratios. Thus, no additional gear set is required for forming the upstream transmission ratio of the electric machine. Furthermore, the fifth shaft has a rotational speed in all gear ratios, as will be presented in more detail further below. The transmission therefore makes it possible for power both to be output and to be received by the electric machine in all forward gear ratios.

Furthermore, provision is made according to the invention for the main gear set to be a stepped planetary gear set, on the carrier of which there are rotatably mounted planet gears with two effective diameters of different size. A stepped planetary gear set with a total of four shafts has either two sun gears and one ring gear, or two ring gears and one sun gear. The four shafts are formed by the carrier and by the three central gears. The central gears are to be understood to mean the ring gears and sun gears. A stepped planetary gear set of said type has a particularly compact construction, and is therefore particularly highly suitable for a transmission with an integrated electric machine. This is because the structural space requirement of the transmission is increased as a result of the inclusion of the electric machine in the transmission. The design of the main gear set as a stepped planetary gear set is suitable for compensating for at least a part of said increased structural space requirement.

In a first embodiment, the stepped planetary gear set has a first and a second sun gear and a first ring gear. The first sun gear meshes by its toothing with the toothing formed on the larger effective diameter of the planet gears and is a constituent part of the first shaft of the main gear set. The second sun gear meshes by its toothing with the toothing formed on the smaller effective diameter of the planet gears and is a constituent part of the second shaft of the main gear set. The carrier is a constituent part of the third shaft of the main gear set. The first ring gear meshes by its toothing with the toothing formed on the larger effective diameter of the planet gears and is a constituent part of the fourth shaft of the main gear set. This embodiment is particularly advantageous with regard to the component loading, because the carrier is a summing shaft of the stepped planetary gear set.

In a second embodiment, the stepped planetary gear set has a first sun gear and a first and a second ring gear. The first sun gear meshes by its toothing with the toothing formed on the smaller effective diameter of the planet gears and is a constituent part of the first shaft of the main gear set. The carrier is a constituent part of the second shaft of the main gear set. The first ring gear meshes by its toothing with the toothing formed on the larger effective diameter of the planet gears and is a constituent part of the fourth shaft of the main gear set. The second ring gear meshes by its toothing with the toothing formed on the smaller effective diameter of the planet gears and is a constituent part of the third shaft of the main gear set. This embodiment offers a higher level of flexibility with regard to the arrangement of the output shaft relative to the drive shaft.

The upstream gear set is preferably a planetary gear set, which has a first element, a second element and a third element. The first element is a sun gear of the planetary gear set and is permanently rotationally fixedly immobilized. If the planetary gear set is a negative or minus gear set, the second element is a carrier of the planetary gear set and the third element is a ring gear of the planetary gear set. If the planetary gear set is a positive or plus gear set, the second element is the ring gear of the planetary gear set and the third element is the carrier of the planetary gear set. The second element is permanently connected to the drive shaft, whereas the third element is a constituent part of the fifth shaft. As a result of the upstream gear set being a planetary gear set, the transmission is suitable even for particularly high levels of power, because a similar spur-gear drive for high levels of power would be exceptionally heavy.

At least eight forward gear ratios between the drive shaft and the output shaft are selectable in automated fashion through selective pairwise actuation of the first to fifth shift elements. The first forward gear ratio is formed by closing the third shift element and the fifth shift element. The second forward gear ratio is formed by closing the second shift element and the fifth shift element. The third forward gear ratio is formed by closing the fourth shift element and the fifth shift element. The fourth forward gear ratio is formed by closing the second shift element and the fourth shift element. The fifth forward gear ratio is formed by closing the third shift element and the fourth shift element. The sixth forward gear ratio is formed by closing the first shift element and the fourth shift element. The seventh forward gear ratio is formed by closing the first shift element and the third shift element. The eighth forward gear ratio is formed by closing the first shift element and the second shift element. Through this assignment of the first to fifth shift elements to the individual forward gear ratios, a transmission ratio series well-suited to use in the motor vehicle is achieved with suitable selection of the fixed carrier transmission ratio of the planetary gear sets. Furthermore, two adjacent gear ratios always have a shift element which is closed in both of said gear ratios. Therefore, during a shift process into an adjacent gear ratio, it is merely necessary for one shift element which is closed to be opened and one shift element that is open to be closed. This simplifies the shift process and shortens the shift duration.

The fifth shift element is preferably a positively locking shift element. Positively locking shift elements produce the connection in the closed state by positive locking, and are characterized by lower drag losses in the open state than frictionally locking shift elements. For example, the fifth shift element may be a dog-clutch shift element, which may also be formed without a synchronizing device. Owing to the low drag losses in the open state, the efficiency of the transmission is further improved, in particular because the fifth shift element is closed only in the first to third forward gear ratios of the motor vehicle. The fifth shift element is therefore predominantly open during the operation of the transmission in the motor vehicle. Since the fifth shift element is closed only in the first to third forward gear ratios, the shift element is always opened, and not closed, during shift processes into a higher gear ratio. An opening of a dog-clutch shift element is considerably more straightforward than the closing process, because the claws of the dog-clutch shift element must firstly engage into the gaps provided for them in the case of closing, whereas the claws merely have to be placed into a load-free state in the case of opening.

The transmission preferably has a sixth shift element. The second shaft of the main gear set can be rotationally fixedly immobilized by closing the sixth shift element, by connecting the second shaft of the main gear set to the housing or to some other rotationally fixed structural element of the transmission. The sixth shift element is in this case open in all forward gear ratios of the transmission. The formation of mechanical reverse gear ratios is made possible by the sixth shift element. In the case of the present transmission, this is necessary only to a limited extent, because a reverse gear ratio is also possible by operation of the electric machine counter to a preferred direction of rotation and engagement of one of the forward gear ratios. However, if operation of the electric machine is not available, for example owing to an energy content deficit in an energy store, at least one mechanical reverse gear ratio between the drive shaft and the output shaft can be provided in a simple manner by the sixth shift element.

A first reverse gear ratio is realized by closing the third shift element and the sixth shift element. Alternatively or in addition to this, a second mechanical reverse gear ratio is realized by closing the second shift element and the sixth shift element. The first reverse gear ratio is particularly advantageous in because the third shift element is likewise closed in the first forward gear ratio. This simplifies a shift process between the first reverse gear ratio and the first forward gear ratio.

The sixth shift element is preferably a positively locking shift element. Since operation of the electric machine will predominantly be available, a major part of the reverse gear ratio operation of the motor vehicle is coverable by the electric machine. The mechanical first and/or second reverse gear ratio is thus required only in exceptional situations, as a result of which a capability for powershifts between the forward gear ratios and the mechanical reverse gear ratios is not imperatively necessary. Thus, the driving operation of the vehicle is not restricted if the sixth shift element is a positively locking shift element without powershift capability. Furthermore, the design of the sixth shift element as a positively locking shift element improves the mechanical efficiency of the transmission, because the sixth shift element is predominantly open during the operation of the motor vehicle.

The drive shaft is preferably connectable via a seventh shift element to a connecting shaft of the transmission. The connecting shaft serves as an interface of the transmission with respect to a drive assembly of the motor vehicle, for example of an internal combustion engine. Owing to the selectable connection between drive shaft and connecting shaft, it is possible for the output shaft to be driven by the electric machine without a connection to the drive assembly of the motor vehicle. The seventh shift element may be either a frictionally locking or a positively locking shift element.

In one embodiment, the transmission has a second electric machine, the rotor of which is permanently rotationally fixedly connected to the connecting shaft. In this way, an internal combustion engine connected to the connecting shaft can also be started with the seventh shift element open, without having an effect on the drive of the motor vehicle.

The transmission may be a constituent part of a hybrid drivetrain of a motor vehicle. The hybrid drivetrain has not only the transmission but also an internal combustion engine which is connected to the connecting shaft of the transmission, preferably connected in rotationally elastic fashion through the provision of a torsional vibration damper. The output shaft of the transmission is connected to an axle transmission which is connected to wheels of the motor vehicle. The hybrid drivetrain permits several drive modes of the motor vehicle. In an electric driving operating mode, the motor vehicle is driven by the electric machine of the transmission, wherein the seventh shift element is open. In an internal combustion engine operating mode, the motor vehicle is driven by the internal combustion engine, wherein the seventh shift element is closed. In a hybrid operating mode, the motor vehicle is driven both by the internal combustion engine and by the electric machine of the transmission.

A planetary gear set includes a sun gear, a carrier and a ring gear. On the carrier there are rotatably mounted planet gears which mesh with the toothing of the sun gear and/or with the toothing of the ring gear. A minus gear set refers to a planetary gear set having a carrier on which the planet gears are rotatably mounted, having a sun gear and having a ring gear, wherein the toothing of at least one of the planet gears meshes both with the toothing of the sun gear and with the toothing of the ring gear, whereby the ring gear and the sun gear rotate in opposite directions of rotation when the sun gear rotates when the carrier is fixed. A plus gear set differs from the minus planetary gear set described immediately above in that the plus gear set has inner and outer planet gears which are rotatably mounted on the carrier. The toothing of the inner planet gears meshes at one side with the toothing of the sun gear and at the other side with the toothing of the outer planet gears. The toothing of the outer planet gears furthermore meshes with the toothing of the ring gear. This has the result that, when the carrier is fixed, the ring gear and the sun gear rotate in the same direction of rotation.

An electric machine is composed at least of a rotationally fixed stator and of a rotatably mounted rotor and is designed such that, in a motor operating mode, it converts electrical energy into mechanical energy as rotational speed and torque, and in a generator operating mode, it converts mechanical energy into electrical energy as current and voltage.

A relative movement between two components is permitted, or a connection for transmitting a torque is produced between the two components, by shift elements in a manner dependent on a state of actuation. A relative movement is to be understood for example to mean a rotation of two components, wherein the rotational speed of the first component and the rotational speed of the second component differ from one another. Furthermore, it is conceivable for only one of the two components to rotate, while the other component is stationary or rotates in the opposite direction.

A permanent connection refers to a connection between two elements which exists at all times. Such permanently connected elements rotate with the same dependency between their rotational speed at all times. No shift element can be situated in a permanent connection between two elements. A permanent connection is therefore distinct from a switchable connection.

BRIEF DESCRIPTION OF THE DRAWINGS

Exemplary embodiments of the invention will be described in detail below on the basis of the attached figures. The following is shown:

FIG. 3 shows an engagement sequence diagram of the transmission as per the first exemplary embodiment;

FIG. 6 shows an engagement sequence diagram of the transmission as per the second exemplary embodiment.

DETAILED DESCRIPTION

Figure 1:
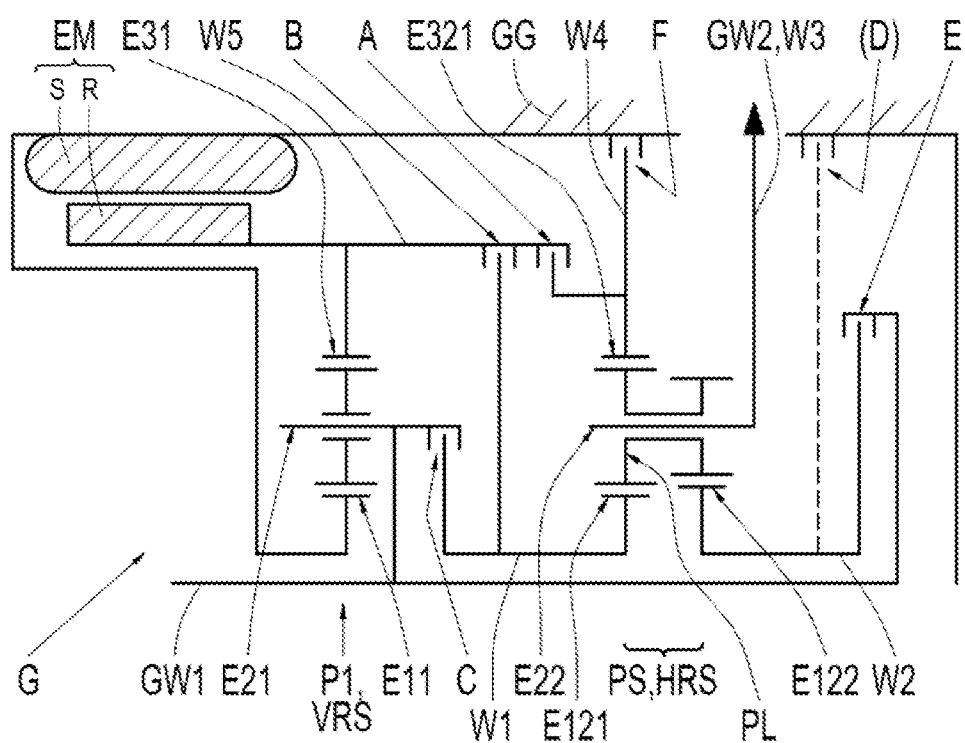
FIG. 1 schematically shows a transmission according to a first exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a transmission G for a motor vehicle according to a first exemplary embodiment of the invention. The transmission G has a drive shaft GW1, an output shaft GW2, an upstream gear set VRS formed as a planetary gear set P1, a main gear set HRS formed as a stepped planetary gear set PS, five shift elements A, B, C, E, F, and an electric machine EM with a rotationally fixed stator S and a rotatable rotor R. The transmission G may optionally also have a sixth shift element D.

The planetary gear set P1 is a minus gear set, and has a first element E11, a second element E21 and a third element E31. The first element E11 is a sun gear of the planetary gear set P1 and is permanently rotationally fixedly immobilized by the sun gear being connected to a housing GG or to some other rotationally fixed structural element of the transmission G. The second element E21 is a carrier of the planetary gear set P1 and is permanently connected to the drive shaft GW1. The third element E31 is a ring gear of the planetary gear set P1 and is connected to the rotor R of the electric machine EM. The rotor R and third element E31 are constituent parts of a fifth shaft W5.

The stepped planetary gear set PS includes planet gears PL which have two effective diameters of different size. A first sun gear E121 meshes by its toothing with the toothing formed on the larger effective diameter of the planet gears PL. A second sun gear E122 meshes by its toothing with the toothing formed on the smaller effective diameter of the planet gears PL. The planet gears PL are rotatably mounted on a carrier E22. A first ring gear E321 meshes by its toothing with the toothing formed on the larger effective diameter of the planet gears PL. The stepped planetary gear set PS forms the main gear set HRS with its total of four shafts W1, W2, W3, W4. The first shaft W1 is assigned to the first sun gear E121. The second shaft W2 is assigned to the second sun gear E122. The third shaft W3 is assigned to the carrier E22. The fourth shaft W4 is assigned to the first ring gear E321. Through this assignment of the four shafts W1, W2, W3, W4 to the elements of the stepped planetary gear set PS, the sequence first shaft W1, second shaft W2, third shaft W3 and fourth shaft W4 corresponds to the rotational speed order thereof.

The first shaft W1 is connectable by the second shift element B to the fifth shaft W5 and by the third shift element C to the drive shaft GW1. The second shaft W2 is connectable by the fourth shift element E to the drive shaft GW1. The second shaft W2 can be rotationally fixedly immobilized by the optionally provided sixth shift element D. The third shaft W3 is permanently connected to the output shaft GW2. The fourth shaft W4 is connectable by the first shift element A to the fifth shaft W5, and can be rotationally fixedly immobilized by the fifth shift element F. The drive shaft GW1 may be connectable by a seventh shift element K0 (not illustrated) to a connecting shaft AN (not illustrated).

The shift elements A, B, C, D, E, F are schematically illustrated as frictionally engaging multi-plate shift elements. This is however not to be regarded as restrictive. Selected shift elements A, B, C, D, E, F may also be dog-clutch shift elements, in particular the fifth shift element F and the sixth shift element D. This applies to all exemplary embodiments.

If the transmission G includes the sixth shift element D, then the transmission G as per the first exemplary embodiment is a so-called front-transverse transmission. For this purpose, a toothing is formed on the output shaft GW2, which meshes with the toothing of a shaft (not illustrated) which is arranged axially parallel with respect to the output shaft GW2. The power of the output shaft GW2 is transmittable via said shaft to wheels DW of a motor vehicle. If the transmission G as per the first exemplary embodiment does not include the sixth shift element D, the transmission G may be either a front-transverse transmission or a so-called front-longitudinal transmission. In the case of a front-longitudinal transmission, the interfaces of drive shaft GW1 and GW2 are arranged at opposite ends of the transmission G, and are arranged coaxially with respect to one another.

Figure 2:
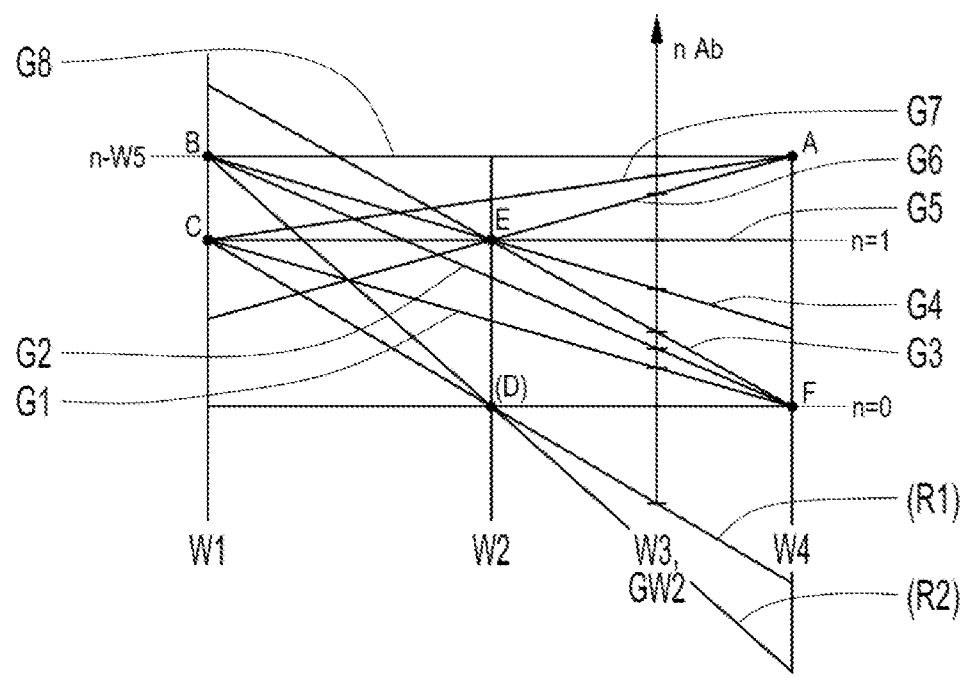
FIG. 2 shows a rotational speed diagram of the transmission as per the first exemplary embodiment.

FIG. 2 shows a rotational speed diagram of the first exemplary embodiment of the transmission G. In said diagram, the rotational speeds of the four shafts W1, W2, W3, W4 of the main gear set HRS are plotted in the vertical direction in relation to the rotational speed n of the drive shaft GW1. The maximum occurring rotational speed n of the drive shaft GW1 is normalized to the value one. The rotational speed n-W5 of the shaft W5 is in this case higher than the rotational speed n of the drive shaft GW1 at all times. The intervals between the four shafts W1, W2, W3, W4 of the main gear set HRS arise from the stationary transmission ratios of the stepped planetary gear set PS. The figure serves merely for illustrative purposes and is not to scale. Rotational speed ratios belonging to a particular operating point can be connected by a straight line. The rotational speed n-Ab of the output shaft GW2 is readable from the third shaft W3.

From the rotational speed diagram illustrated in FIG. 2, it is clear that the drive shaft GW1 and thus also the fifth shaft W5 have a non-zero rotational speed in all gear ratios. It is therefore possible for power to be output or to be received by the electric machine EM in all gear ratios.

FIG. 3 shows an engagement sequence diagram of the transmission G as per the first exemplary embodiment. Indicated in the rows of the engagement sequence diagram are eight forward gear ratios G1 to G8 and a first and a second reverse gear ratio R1, R2, an operating mode GEN for standstill charging, and a parking lock P. In the columns of the engagement sequence diagram, a circle indicates which of the shift elements A, B, C, D, E, F, K0 are closed in which gear ratio or operating mode. The mode of operation of the transmission G becomes clear from the engagement sequence diagram in FIG. 3 and the rotational speed diagram in FIG. 2.

The transmission ratios between the drive shaft GW1 and the output shaft GW2 are illustrated in the upper half of the engagement sequence diagram. The transmission ratios between the fifth shaft W5 and the output shaft GW2 are illustrated in the lower half of the engagement sequence diagram. Such transmission ratio series are well-suited to the use of the transmission G in the motor vehicle drivetrain. The specific transmission ratios arise from the stationary transmission ratios of the planetary gear set P1 and of the stepped planetary gear set PS.

The operating mode GEN is suitable for the standstill charging of the motor vehicle when the motor vehicle is at a standstill. Only the seventh shift element K0 is closed, wherein a drive assembly connected to the connecting shaft AN can drive the electric machine EM. No gear ratio is engaged, whereby no power is transmitted to the output shaft GW2.

If both the fifth shift element F and the sixth shift element D are positively locking dog-clutch shift elements, a parking lock P is realizable by closing both of said shift elements. This is because, as a result of rotationally fixed immobilization of two shafts of the main gear set HRS, in this case immobilization of the second shaft W2 and of the fourth shaft W4, the output shaft W3 is also rotationally fixedly immobilized. The fifth and sixth shift element F, D are preferably formed such that, in the de-energized state, they reliably maintain their shift state.

Figure 4:
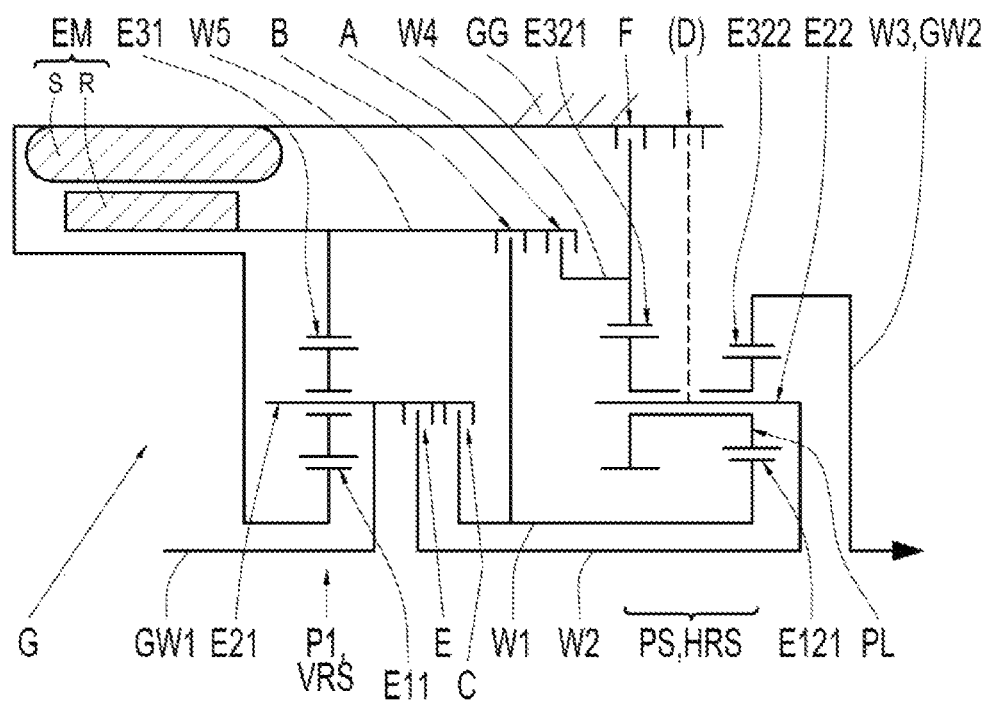
FIG. 4 schematically shows a transmission according to a second exemplary embodiment of the invention.

FIG. 4 schematically shows a transmission G according to a second exemplary embodiment of the invention. By contrast to the first exemplary embodiment, the main gear set HRS as the stepped planetary gear set PS has a modified construction. The stepped planetary gear set PS as per the second exemplary embodiment has only a single sun gear, which is referred to as the first sun gear E121. The first sun gear E121 meshes, by its toothing, with the toothing formed on the smaller effective diameter of the planet gears PL. For this purpose, the stepped planetary gear set PS has not only the first ring gear E321 but also a second ring gear E322, which meshes by its toothing with the toothing formed on the smaller effective diameter of the planet gears PL. The first ring gear E321 furthermore meshes with the toothing formed on the larger effective diameter of the planet gears PL.

Through this modified construction of the stepped planetary gear set PS, the assignment of the shafts W1, W2, W3, W4 to the elements of the stepped planetary gear set PS is also changed. The first shaft W1 is assigned to the first sun gear E121. The second shaft W2 is assigned to the carrier E22. The third shaft W3 is assigned to the second ring gear E322. The fourth shaft W4 is assigned to the first ring gear E321.

The transmission G of the second exemplary embodiment is suitable both for an embodiment as a front-longitudinal transmission and for an embodiment as a front-transverse transmission, regardless of whether or not the sixth shift element D is provided. This is because the switchable connection of the second shaft W2 to the housing GG may, proceeding from the carrier E22, be arranged between the two effective diameters of the planet gears PL. FIG. 4 illustrates by way of example an arrangement with a coaxial drive and output, that is to say an embodiment as a front-longitudinal transmission.

Figure 5:
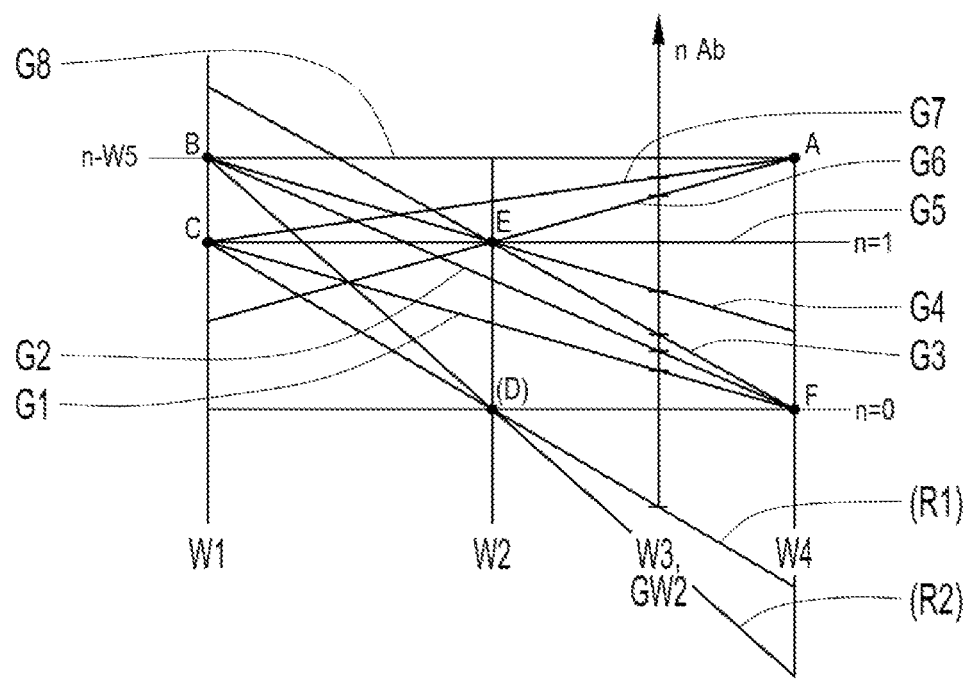
FIG. 5 shows a rotational speed diagram of the transmission as per the second exemplary embodiment.

FIG. 5 shows a rotational speed diagram of the second exemplary embodiment of the transmission G, which is substantially identical to the rotational speed diagram of the first exemplary embodiment as illustrated in FIG. 2. It should be noted that the figure serves merely for illustrative purposes and is not to scale.

FIG. 6 shows an engagement sequence diagram of the transmission G as per the second exemplary embodiment. Aside from the different transmission ratios, the engagement sequence diagram is identical to the engagement sequence diagram illustrated in FIG. 3.

Figure 7:
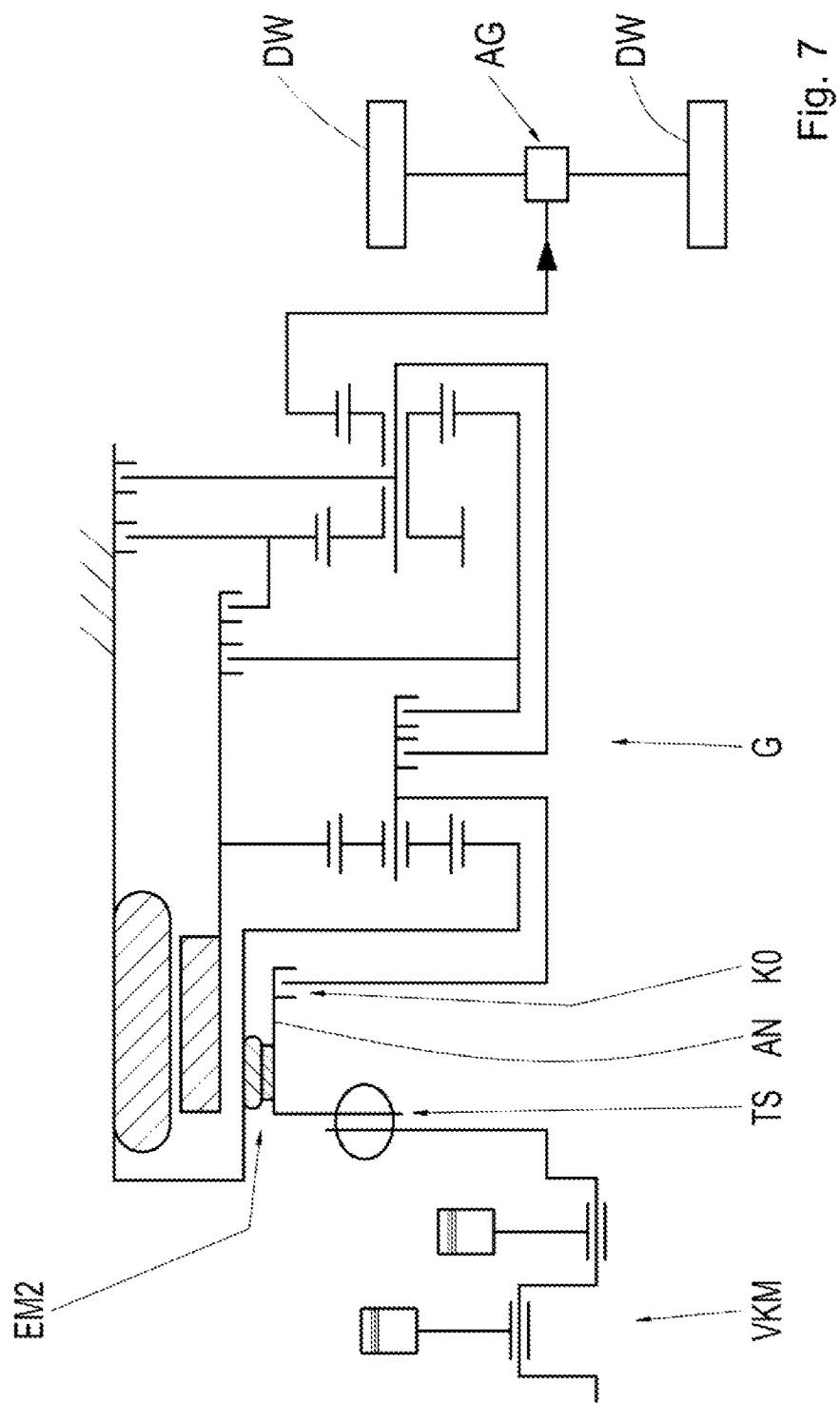
FIG. 7 shows a hybrid drivetrain of a motor vehicle.

FIG. 7 shows a hybrid drivetrain of a motor vehicle having a transmission G as per the second exemplary embodiment. This is to be regarded merely as an example. The hybrid drivetrain could be implemented with any of the specified exemplary embodiments of the transmission G. The hybrid drivetrain has an internal combustion engine VKM which is connected via a torsional vibration damper TS to the connecting shaft AN of the transmission G. The connecting shaft AN is connectable via the seventh shift element K0 to the drive shaft GW1 of the transmission G. The output shaft GW2 has a drive connection to an axle transmission AG. The power acting at the output shaft GW2 is distributed from the axle transmission AG to wheels DW of the motor vehicle. In the motor operating mode of the electric machine EM, electrical power is supplied to the stator S via an inverter (not illustrated). In the generator operating mode of the electric machine EM, the stator S supplies electrical power to the inverter.

The transmission G illustrated in FIG. 7 additionally has a second electric machine EM2, the rotor of which is rotationally fixedly connected to the connecting shaft AN. The second electric machine EM2 is provided optionally. Through the second electric machine EM, the internal combustion engine VKM can be started even when the seventh shift element K0 is open. When the seventh shift element K0 is closed, the second electric machine EM2 can also contribute to the driver of the motor vehicle. Such a second electric machine EM2 may be used in any exemplary embodiment of the transmission G. The second electric machine EM2 may also be arranged outside the transmission G, for example as a belt-type starter-generator on the internal combustion engine VKM.

Modifications and variations can be made to the embodiments illustrated or described herein without departing from the scope and spirit of the invention as set forth in the appended claims.

REFERENCE DESIGNATIONS

G Transmission
GW1 Drive shaft
GW2 Output shaft
AN Connecting shaft
GG Housing
EM Electric machine
S Stator
R Rotor
VRS Upstream gear set
HRS Main gear set
W1 First shaft
W2 Second shaft
W3 Third shaft
W4 Fourth shaft
W5 Fifth shaft
n Rotational speed of the drive shaft
n-Ab Rotational speed of the output shaft
n-W5 Rotational speed of the fifth shaft
P1 Planetary gear set
E11 First element of the planetary gear set
E21 Second element of the planetary gear set
E31 Third element of the planetary gear set
PS Stepped planetary gear set
E121 First sun gear of the stepped planetary gear set
E122 Second sun gear of the stepped planetary gear set
E22 Carrier of the stepped planetary gear set
PL Planet gears of the stepped planetary gear set
E321 First ring gear of the stepped planetary gear set
E322 Second ring gear of the stepped planetary gear set
A First shift element
B Second shift element
C Third shift element
E Fourth shift element
F Fifth shift element
D Sixth shift element
K0 Seventh shift element
G1-G8 First to eighth forward gear ratio
R1 First reverse gear ratio
R2 Second reverse gear ratio
GEN Operating mode
P Parking lock
VKM Internal combustion engine
DW Wheels
AG Axle transmission
TS Torsional vibration damper
EM2 Second electric machine

The invention claimed is:
1. A transmission (G) for a motor vehicle, comprising:
a drive shaft (GW1);
an output shaft (GW2);
an upstream gear set (VRS); and
a main gear set (HRS), wherein the main gear set has a total of four shafts (W1, W2, W3, W4), the four shafts referred to in order of rotational speeds as a first shaft, a second shaft, a third shaft and a fourth shaft, wherein the main gear set has first, second, third, fourth and fifth shift elements (A, B, C, E, F), the selective pairwise closure of which realizes at least eight selectable forward gear ratios (G1-G8) between the drive shaft (GW1) and the output shaft (GW2) of the transmission (G), wherein the upstream gear set (VRS) is configured to provide a rotational speed at a fifth shaft (W5) that is increased relative to a rotational speed of the drive shaft (GW1) in a fixed transmission ratio with respect to the drive shaft (GW1), wherein the fifth shaft (W5) is connectable to the fourth shaft (W4) by closing the first shift element (A), wherein the fifth shaft (W5) is connectable to the first shaft (W1) by closing the second shift element (B), wherein the drive shaft (GW1) is connectable to the first shaft (W1) by closing the third shift element (C), wherein the drive shaft (GW1) is connectable to the second shaft (W2) by closing the fourth shift element (E), wherein the fourth shaft (W4) is rotationally fixable by closing the fifth shift element (F), wherein the third shaft (W3) is permanently connected to the output shaft (GW2), wherein the main gear set (HRS) is a stepped planetary gear set (PS), planet gears (PL) with two effective diameters of different size are rotatably mounted on a carrier (E22) of the stepped planetary gear set (PS), and wherein the transmission (G) has an electric motor (EM) with a rotationally fixed stator (S) and a rotatable rotor (R), wherein the rotor (R) is permanently rotationally fixedly connected to the fifth shaft (W5).

2. The transmission (G) of claim 1, wherein:
the stepped planetary gear set (PS) has a first and a second sun gear (E121, E122) and a first ring gear (E321);
the first sun gear (E121) meshes with the larger effective diameter of the planet gears (FL) and is a constituent part of the first shaft (W1);
the second sun gear (E122) meshes with the smaller effective diameter of the planet gears (PL) and is a constituent part of the second shaft (W2);
the carrier (E22) is a constituent part of the third shaft (W3); and
the first ring gear (E321) meshes with the larger effective diameter of the planet gears (PL) and is a constituent part of the fourth shaft (W4).

3. The transmission (G) of claim 1, wherein:
the stepped planetary gear set (PS) has a first sun gear (E121) and a first and a second ring gear (E321, E322);
the first sun gear (E121) meshes with the smaller effective diameter of the planet gears (PL) and is a constituent part of the first shaft (W1);
the carrier (E22) is a constituent part of the second shaft (W2);
the first ring gear (E321) meshes with the larger effective diameter of the planet gears (PL) and is a constituent part of the fourth shaft (W4); and
the second ring gear (E322) meshes with the smaller effective diameter of the planet gears (PL) and is a constituent part of the third shaft (W3).

4. The transmission (G) of claim 1, wherein:
the upstream gear set (VRS) is a planetary gear set (P1);
the planetary gear set (P1) has a first element (E11), a second element (E21) and a third element (E31);
the first element (E11) is a sun gear of the planetary gear set (P1);
the second element (E21) is a carrier of the planetary gear set (P1) when the planetary gear set (P1) is a minus gear set or is a ring gear of the planetary gear set (P1) when the planetary gear set (P1) is a plus gear set;
the third element (E31) is the ring gear of the planetary gear set (P1) when the planetary gear set (P1) is the minus gear set and is the carrier of the planetary gear set (P1) when the planetary gear set (P1) is the plus gear set; and
the first element (E11) is permanently rotationally fixedly immobilized, wherein the second element (E21) is connected to the drive shaft (GW1) and wherein the third element (E31) is a constituent part of the fifth shaft (W5).

5. The transmission (G) of claim 1, wherein:
a first forward gear ratio (G1) of the at least eight selectable forward gear ratios (G1-G8) is realized by closing the third shift element (C) and the fifth shift element (F);
a second forward gear ratio (G2) of the at least eight selectable forward gear ratios (G1-G8) is realized by closing the second shift element (B) and the fifth shift element (F);
a third forward gear ratio (G3) of the at least eight selectable forward gear ratios (G1-G8) is realized by closing the fourth shift element (E) and the fifth shift element (F);
a fourth forward gear ratio (G4) of the at least eight selectable forward gear ratios (G1-G8) is realized by closing the second shift element (B) and the fourth shift element (E);
a fifth forward gear ratio (G5) of the at least eight selectable forward gear ratios (G1-G8) is realized by closing the third shift element (C) and the fourth shift element (E);
a sixth forward gear ratio (G6) of the at least eight selectable forward gear ratios (G1-G8) is realized by closing the first shift element (A) and the fourth shift element (E);
a seventh forward gear ratio (G7) of the at least eight selectable forward gear ratios (G1-G8) is realized by closing the first shift element (A) and the third shift element (C); and
an eighth forward gear ratio (G8) of the at least eight selectable forward gear ratios (G1-G8) is realized by closing the first shift element (A) and the second shift element (B).

6. The transmission (G) of claim 1, wherein the fifth shift element (F) is a dog-clutch shift element.

7. The transmission (G) of claim 6, wherein the transmission (G) has a sixth shift element (D), wherein the second shaft (W2) is rotationally fixable by closing the sixth shift element (D), wherein the sixth shift element (D) is open in all forward gear ratios (G1-G8).

8. The transmission (G) of claim 7, wherein a first reverse gear ratio (R1) is realized by closing the third shift element (C) and the sixth shift element (D).

9. The transmission (G) of claim 7, wherein a second reverse gear ratio (R2) is realized by closing the second shift element (B) and the sixth shift element (D).

10. The transmission (G) of claim 7, wherein the sixth shift element (D) is a dog-clutch shift element, wherein a parking lock (P) of the transmission (G) is realized by closing the fifth and the sixth shift elements (F, D).

11. The transmission (G) of claim 1, further comprising a connecting shaft (AN) which is connectable by a seventh shift element (K0) to the drive shaft (GW1).

12. The transmission (G) of claim 11, further comprising a second electric motor (EM2), a rotor of the second electric motor (EM2) is permanently rotationally fixedly connected to the connecting shaft (AN).

13. A hybrid drivetrain for a motor vehicle comprising the transmission (G) of claim 1.

* * * * *